United States Patent [19]
Houde

[11] Patent Number: 5,995,932
[45] Date of Patent: Nov. 30, 1999

[54] FEEDBACK MODIFICATION FOR ACCENT REDUCTION

[75] Inventor: John F. Houde, San Francisco, Calif.

[73] Assignee: Scientific Learning Corporation, Berkeley, Calif.

[21] Appl. No.: 09/001,508

[22] Filed: Dec. 31, 1997

[51] Int. Cl.$^6$ .............................. G10L 3/00; G10L 5/06; G09B 19/08; G09B 19/06; G09B 19/04

[52] U.S. Cl. .................... 704/261; 704/275; 704/271; 704/255; 434/169; 434/167; 434/157

[58] Field of Search ..................... 704/255, 254, 704/200, 275, 270, 261, 271; 434/169, 167, 157

[56] References Cited

U.S. PATENT DOCUMENTS

| | | |
|---|---|---|
| 4,020,567 | 5/1977 | Webster . |
| 4,472,833 | 9/1984 | Turrell et al. . |
| 4,615,680 | 10/1986 | Tomatis . |
| 5,015,179 | 5/1991 | Resnick . |
| 5,220,639 | 6/1993 | Lee .......................................... 704/200 |
| 5,307,442 | 4/1994 | Abe et al. . |
| 5,362,240 | 11/1994 | Cave et al. . |
| 5,393,236 | 2/1995 | Blackmer et al. . |
| 5,425,130 | 6/1995 | Morgan . |
| 5,503,560 | 4/1996 | Stentiford . |
| 5,634,086 | 5/1997 | Rtischev et al. . |
| 5,680,510 | 10/1997 | Hon et al. ................................. 704/255 |
| 5,751,905 | 5/1998 | Chen et al. .............................. 704/254 |

OTHER PUBLICATIONS

Sensorimotor Adaptation in Speech Production by John Francis Houde, Feb. 5, 1997.

Koh, S. et al., "A Speech Synthesizer for Mandarin Chinese," *IEEE Transactions on Consumer Electronics*, vol. 36, No. 4 (Nov. 1990).

Lee, L., Improved Tone Concatenation Rules in a Formant-Based Chinese Text–to–Speech System, *IEEE Transactions on Speech and Audio Processing*, vol. 1, No. 3 (Jul. 1993).

Lee et al., ("A Real–Time Mandarin Dictation machine for chinese language with unlimited texts and very large vocabulary", ICASSP'90: Acoustics, Speech and Signal Processing Conference, Feb. 1990, pp. 65–68).

*Primary Examiner*—David R. Hudspeth
*Assistant Examiner*—Vijay B Chawan
*Attorney, Agent, or Firm*—Christensen, O'Connor, Johnson & Kindness PLLC

[57] ABSTRACT

A training system used while a person is speaking uses a feedback modification technique to reduce accents. As the speaker is speaking, the system feeds back to the speaker the speaker's speech in "real-time" so that the speaker, in effect, hears what he or she is saying while saying it. The system includes a detector configured to monitor a speaker's speech to detect a preselected target vowel sound that the speaker wishes to produce accurately. In response to the detector detecting a "target" vowel sound, a cue generator generates a sensory cue (e.g., an amplification of the "target" vowel sound) that is perceived by the speaker. As the speaker is speaking, the generator feeds back to the speaker the sensory cue along with the speech so that the cue is coincident with the "target" vowel sound.

29 Claims, 4 Drawing Sheets

FEEDBACK MODIFICATION FOR ACCENT REDUCTION

FIELD OF THE INVENTION

The present invention relates to speech training and, more particularly, to methods and devices to reduce accents.

BACKGROUND

As is commonly observed, a person that has learned to speak a second (or third, etc.) language will typically have an accent. A significant aspect of the accent is in the formation of vowel sounds.

FIG. 1 is a graph illustrating an exemplary vowel sound in the frequency domain (i.e., magnitude as a function of frequency). The vowel sound, when plotted as the magnitude of the sound as a function of frequency, generally forms a curve 100 having a series of local maxima at various frequencies along the frequency band of interest, generally about zero to about five kHz. FIG. 1 shows four local maxima 101–104. The frequencies of the local maxima are commonly referred to as "formants". The formant with the lowest frequency is referred to as formant F1. Similarly, the second lowest frequency formant is referred to as formant F2, the third lowest frequency formant is referred to as formant F3 and so on.

A vowel sound may be sufficiently identified by the frequencies of formants F1 and F2. FIG. 2 is a graph illustrating an exemplary group of vowel sounds produced by a native speaker of English. In particular, the graph was formed by plotting, for each vowel sound in the language's vowel set, formant F2 of that vowel sound as a function of that vowel sound's F1 formant. For example, the vowel sound [i] (using the well-known IPA nomenclature) has a relatively high F2 formant with a relatively low F1 formant. Conversely, the vowel sound "a" has a relatively low F2 formant with a relatively high F1 formant. A monotonic curve 200 can be drawn containing the vowel sounds [i], [I], [ɛ], [æ] and [a], as shown in FIG. 2.

However, it has been observed that the vowel set of a person's native language may not include one or more vowel sounds in the new language that the person is speaking. It is thought that the person speaking is not sensitive to these vowel sounds in either hearing or speaking these vowel sounds. Thus, the speaker typically cannot determine whether he or she is correctly producing the target sound. Of course, this deficiency hinders the speaker's training in reducing the speaker's accent. Accordingly, there is a need for a system that helps speakers to become sensitive to target vowel sounds when speaking a non-native language.

SUMMARY

In accordance with the present invention, a training system for reducing accents is provided. In one embodiment, the system uses a feedback modification technique to reduce accents. In one aspect of this embodiment, as the speaker is speaking, the system feeds back to the speaker the speaker's speech in "real-time" so that the speaker can, in effect, hear what he or she is saying while saying it.

In addition, this embodiment includes a detector that is configured to monitor a speaker's speech to detect a target vowel or vowels that are missing from the vowel set of the speaker's native language. When the detector detects a "target" vowel sound, the detector causes a cue generator to generate a sensory cue that can be perceived by the speaker. As the speaker is speaking, the generator feeds back the speech cue along with the speech so that the cue is coincident with the "target" vowel sound being fed back to the speaker. In one particular embodiment, the cue is an increase in amplitude of the vowel sound. As a result of this real-time feedback, the speaker receives a sensory cue whenever the speaker has correctly produced the "target" vowel sound.

The speaker is trained using the system for a significant period of time so as to become "sensitive" to the "target" vowel sound. Through the use of the real-time sensory cues, the speaker is immediately informed if he or she correctly produced the target vowel sound. Unlike conventional accent reduction techniques, the real-time sensory cues allow the speaker to recognize when he or she produced the target vowel sound so that the speaker can more easily and quickly learn to consistently produce the target vowel sound correctly.

DETAILED DESCRIPTION

Figure 1:
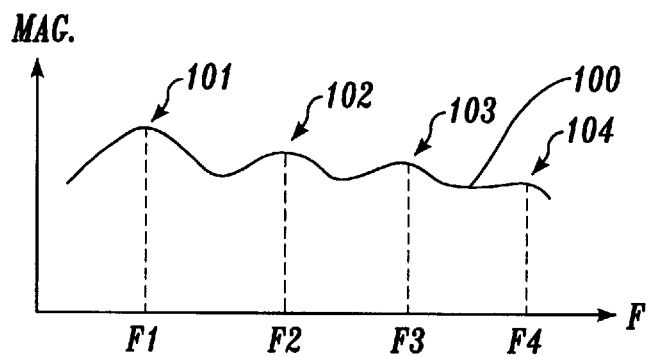
FIG. 1 is a diagram illustrative of a frequency domain representation of a vowel sound produced by a person while speaking.
Figure 2:
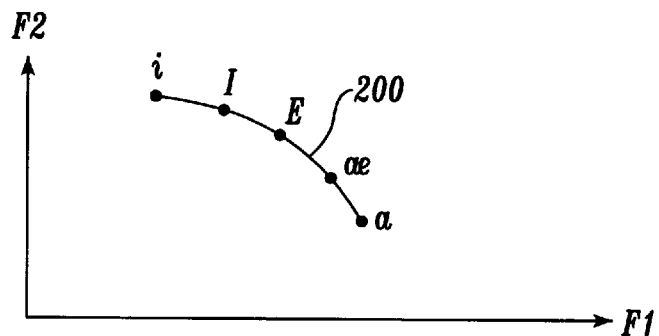
FIG. 2 is a diagram illustrative of the F1 and F2 formants of some of the vowel sounds produced by a speaker while speaking.
Figure 3:
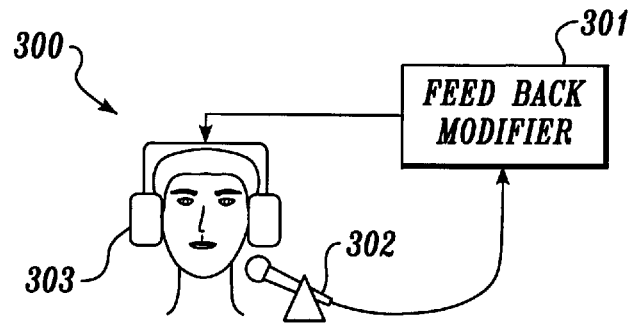
FIG. 3 is a block diagram of a system to reduce accents, in accordance with one embodiment of the present invention.

FIG. 3 is a block diagram of a feedback modification system 300 for reducing accents, in accordance with one embodiment of the present invention. System 300 includes an accent modifier or feedback modifier 301, a microphone 302 and an earphone headset 303. A speaker trying to reduce his or her accent speaks into microphone 302 and wears earphones 303, which are both connected to feedback modifier 301.

Although conventional microphone and earphones are described, in other embodiments any suitable acoustic input device and acoustic output device can be used. For example, the acoustic input device can be a device capable of providing an electrical or optic signal as a function of an input acoustic signal. Likewise, for example, the acoustic output device can be any suitable transducer device capable of generating an acoustic signal as a function of an electrical or optical signal.

In operation, the speaker speaks into microphone 302, which converts the speech into an electrical signal representative of the speech. Feedback modifier 301 receives the electrical signal and selectively modifies the electrical signal as described below in conjunction with FIGS. 4–8, using a sensory cue technique in accordance with the present invention.

In this application, feedback modifier 301 receives the electrical signal from microphone 302 and monitors the signal to detect when the speaker makes a sound that is normally missing from the speaker's native language. This "missing" sound is referred to herein as the target sound. In one embodiment, the speaker speaks into system 300 over a significant period of time (e.g., about one hour training sessions for about two or three months). For example, system 300 may be configured to provided a series of words and/or sentences (recorded from a native speaker) to the speaker through earphones 303, which the speaker then repeats into microphone 302.

Via earphones 303, feedback modifier 301 feeds back the sounds to the speaker in real-time, along with a cue coincident with the detected target sound. In one embodiment, the cue is implemented by amplifying the detected target sound relative to all of the other sounds. In this embodiment, the target sound is a target vowel sound. As described above, missing vowel sounds are commonly a significant aspect of the speaker's accent. As a result, by monitoring for a target vowel sound and feeding back in real time a sensory cue coincident with the target vowel sound, the speaker is provided with an indication that the speaker is correctly producing the target vowel sound. It is believed that speaker can, by being sensitized to the target vowel sound, more quickly and easily learn to consistently and accurately produce the target vowel sound in normal speech. In particular, the speaker is trained to produce the target sound in the appropriate words, thereby reducing the speaker's accent.

Figure 4:
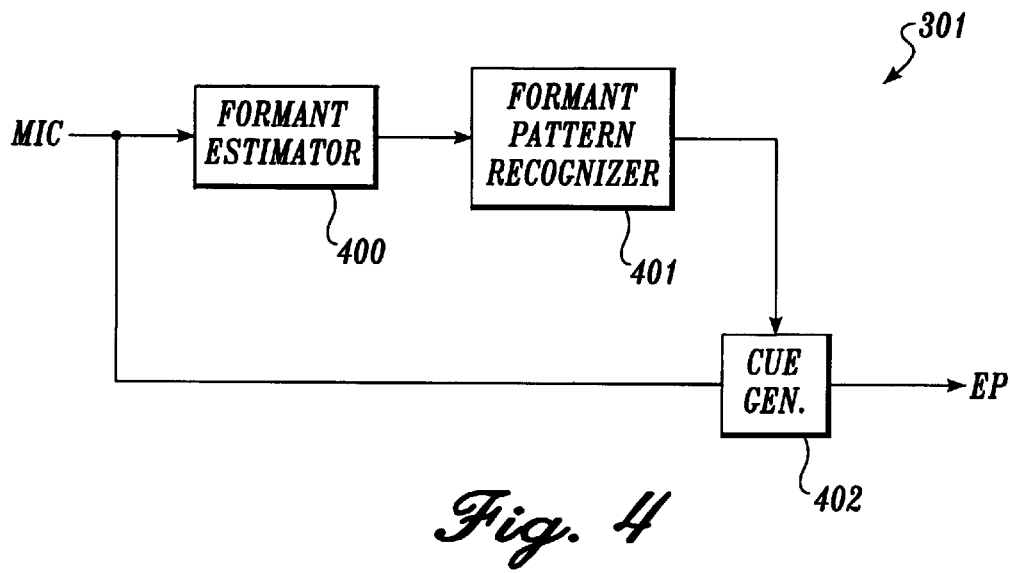
FIG. 4 is a simplified block diagram of the adapter of FIG. 3, in accordance with one embodiment of the present invention.

FIG. 4 is a simplified functional block diagram of feedback modifier 301 (FIG. 3), in accordance with one embodiment of the present invention. In this embodiment, feedback modifier 301 includes a formant estimator 400, a formant pattern recognizer 401 and a cue generator 402. Formant estimator 400 is connected to receive the electrical signal from microphone 302 (FIG. 3) and output a signal to formant pattern recognizer 401. Cue generator 402 has a first input lead connected to an output lead of formant pattern recognizer 401 and a second input lead connected to microphone 302 (FIG. 3). The operation of feedback modifier 301 is described below in conjunction with FIG. 8.

Figure 8:
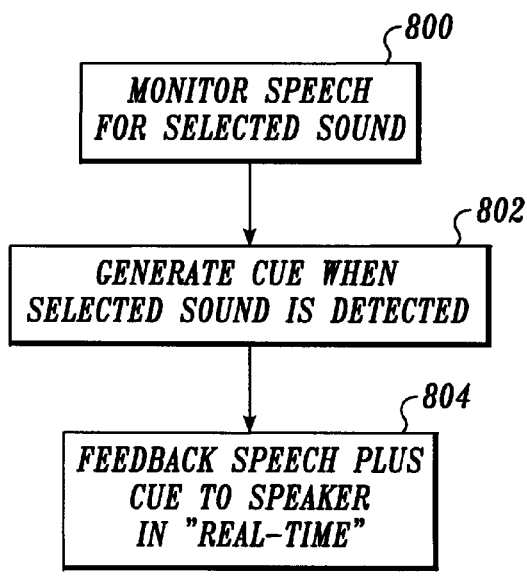
FIG. 8 is a flow diagram of illustrative of the operation of the adapter of FIG. 3, in accordance with one embodiment of the present invention.

FIG. 8 is a flow diagram of illustrative of the operation of feedback modifier 301 (FIG. 4), in accordance with one embodiment of the present invention. Referring to FIGS. 4 and 8, feedback modifier 301 operates as follows. In a step 800, feedback modifier 301 (through formant estimator 400) monitors the speaker's speech through the electrical signal generated by microphone 302 (FIG. 3). As is well known, a microphone converts the acoustic signals of speech into representative electrical signals. Typically, the instantaneous voltage of the electrical signal generated by a microphone is a function of the instantaneous magnitude of the acoustic signal. Formant estimator 400 is configured to estimate the formants of the sounds produced by the speaker during training.

In a next step 802, feedback modifier 301 (through formant pattern recognizer 401, detects the occurrence of a preselected vowel sound (i.e., the target vowel sound) within the speaker's speech. Typically, the preselected target vowel sound is a vowel sound "missing" from the vowel sounds of the speaker's native language. In this embodiment, formant pattern recognizer 401 is preconfigured to detect whether the detected F1 and F2 formants from formant estimator 400 match the preconfigured F1 and F2 formants of the selected vowel sound. If the detected F1 and F2 formants match the preconfigured F1 and F2 formants of the selected vowel sound, formant pattern recognizer 401 causes cue generator 402 to generate a cue; otherwise, cue generator 402 does not generate the cue. In this embodiment, the cue is an amplification of the detected "target" vowel sound.

In a next step 804, cue generator 402 feeds back the sound produced by the speaker in "real time" via earphones 303 (FIG. 3). In this accent reduction application, "real-time" refers to a delay of about 30 ms or less in feeding back sounds to the speaker. Delays greater than 30 ms tend to disrupt or interfere with the speaker's speech. In particular, if a target vowel sound is not detected by formant pattern recognizer 401, cue generator 402 simply provides the electrical signal to the earphones (and thereby feeding back the sound to the speaker) at a base or reference level amplification. However, if formant pattern recognizer 401 does detect a match to the target vowel sound, cue generator 402 amplifies the electrical signal (relative to the base or reference level amplification) that is provided to the earphones, thereby feeding back the amplified target vowel sound to the speaker.

Accordingly, after a period of training as described above in conjunction with FIG. 3, it is believed that this feedback causes the speaker to become sensitive to the amplified target vowel sound. Thus, the speaker is thought to more quickly and easily learn to hear and produce the target vowel sound in normal speech.

Figure 5:
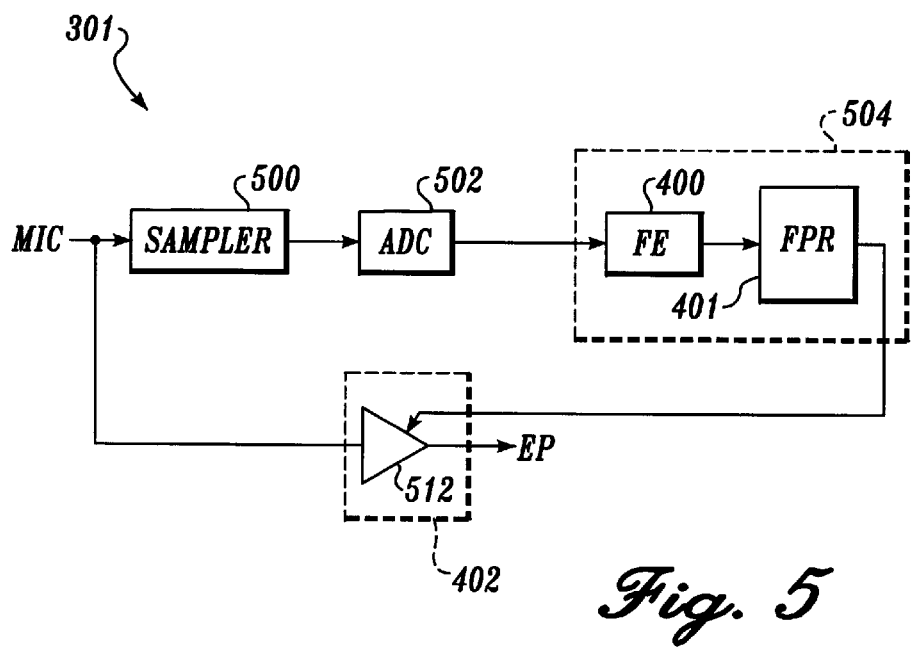
FIG. 5 is a more detailed block diagram of the adapter of FIG. 4, in accordance with one embodiment of the present invention.

FIG. 5 is a more detailed functional block diagram of feedback modifier 301 (FIG. 4), in accordance with one embodiment of the present invention. In this embodiment, feedback modifier 301 is implemented with a sampler 500, an analog-to-digital converter (ADC) 502, formant estimator 400 and formant pattern recognizer 401. Formant estimator 400 and formant pattern recognizer 401 are implemented using a digital signal processor (DSP) system 504. Such a DSP system is described below in conjunction with FIG. 6. DSP system 504 implements formant estimator 400 and formant pattern recognizer 401 as described in "Sensorimotor Adaptation In Speech Production", John F. Houde, Doctoral Dissertation, Massachusetts Institute of Technology, Cambridge, Massachusetts, 1997 which is incorporated herein by reference in its entirety. In particular, DSP system 504 is configured in the conventional manner (i.e., software or firmware programming) to perform the function of formant estimator 400 by monitoring the spectrum of the sounds from the speaker and estimating the formants of each sound. DSP system 504 is also configured to perform the function of the formant pattern recognizer 401 by comparing the estimated formants to the formants of the target vowel sound. If the estimated formants substantially match the formants of the target vowel sound, DSP system 504 provides a control signal which indicates whether a match has been detected by formant pattern recognizer 401.

The control signal generated by DSP system 504 is received by cue generator 402 at a control-input lead 514. In this embodiment, cue generator 402 is implemented using an adjustable amplifier 512 (i.e., an amplifier having a gain that is controlled by a voltage or current received at control input lead 514), which amplifies the signal received from microphone 302 (FIG. 3) and provides this amplified signal to earphones 303 (FIG. 3). For example, in this embodiment, amplifier 512 is biased by the voltage at control input lead 514. Thus, when DSP system 504 provides a low voltage at control input lead 514, amplifier 512 provides to earphones 303 (FIG. 3) a relatively low amplification of the signal received from microphone 302 (FIG. 3). Conversely, when DSP system 504 provides a high voltage at control input lead 514, amplifier 512 provides to the earphones a relatively high amplification of the signal received from the microphone. In this way, this embodiment of feedback modifier 301 selectively increases the amplification any "target" vowel sound produced by the speaker into microphone 302, which is then fed back to the speaker via earphones 303 (FIG. 3).

Figure 6:
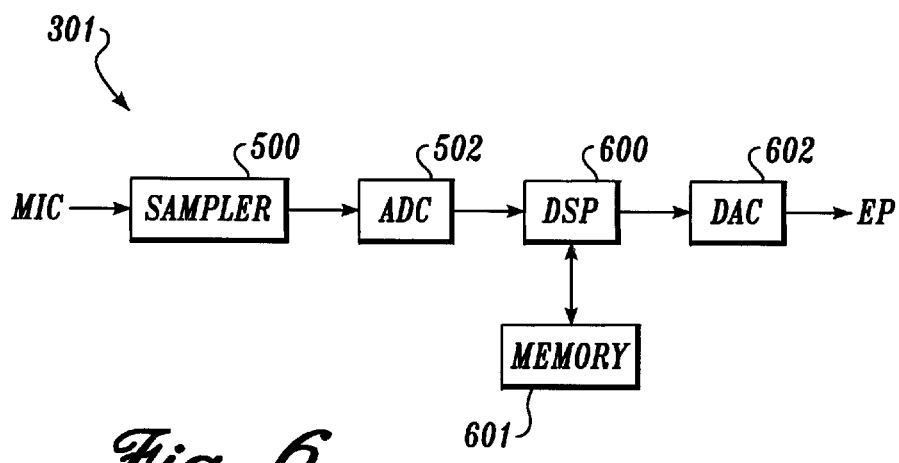
FIG. 6 is a block diagram of the feedback modifier using a digital signal processor, in accordance with another embodiment of the present invention.

FIG. 6 is a block diagram of feedback modifier 301 (FIG. 3) using a digital signal processor (DSP) 600, in accordance with another embodiment of the present invention. DSP 600 can be any suitable commercially available DSP device such as, for example, a model DSP-96 from Ariel Corp., the databook and programming manual of which is incorporated herein by reference in its entirety. In this embodiment, feedback modifier 301 is similar to the embodiment of FIG. 5 except that DSP 600 provides the functionality of amplifier 512. In particular, this embodiment of feedback modifier 301 includes a memory 601 and a digital-to-analog converter (DAC) 602 as well as DSP 600, sampler 500 and ADC 502. In some alternative embodiments, DSP 600 can be implemented with a DSP device that also includes the functionality of sampler 500, ADC 502 and DAC 602.

DSP 600 is configured in the conventional manner using software programming to include the functions of formant estimator 400 and formant pattern recognizer 401. However, instead of using amplifier 512 (FIG. 5), in this embodiment, the amplification is performed digitally by scaling the digital output signals generated by ADC 502. The software program is stored in memory 601. Memory 601 can be implemented using any suitable type of memory device such as, for example, a dynamic random access memory (DRAM) device or non-volatile memory device (e.g., erasable programmable read only memory (EPROM) device).

Figure 7:
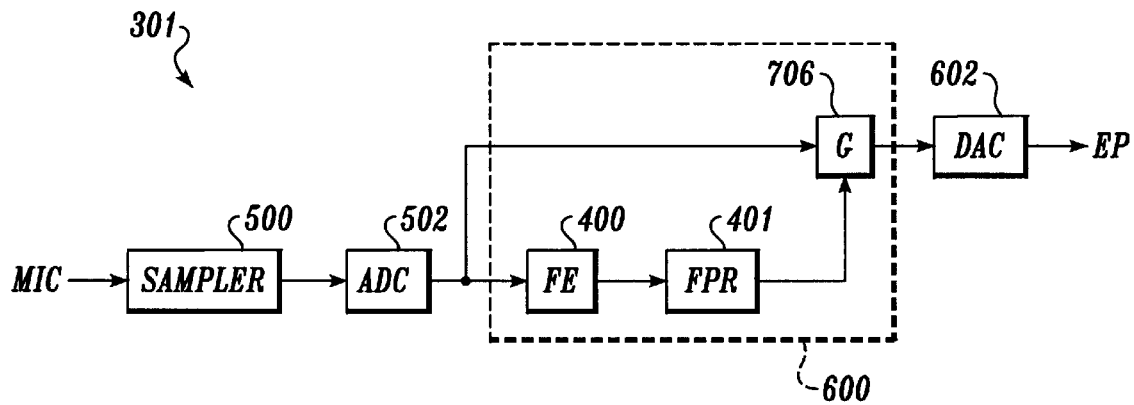
FIG. 7 is a block diagram of another embodiment of the feedback modifier according to the present invention.

In this embodiment, the model DSP-96 device implementing DSP 600 is operated at a clock rate of about thirty MHz, thereby enabling DSP 600 to process in "real-time" sixteen-bit samples generated by sampler 500 and ADC 502 at a ten kHz sampling rate. DSP 600 is configured to implement formant estimator 400 and formant pattern recognizer 401 as described above in conjunction with FIG. 5 to detect matches of the estimated formants with the formants of the target vowel sound. However, instead of using amplifier 512 (FIG. 5), DSP 600 implements formant pattern recognizer 401 to scale or multiply the samples from ADC 502 to provide the aforementioned amplification when a match is detected. DAC 602 then converts the digital amplified output signal from DSP 600 into an analog form that is usable by earphones 303 (FIG. 3). A more detailed functional block diagram of feedback modifier 301 (FIG. 6) is shown in FIG. 7, with the scaling functionality indicated by a gain stage 706.

This embodiment of feedback modifier 301 operates as follows. Sampler 500 samples the electrical signal generated by microphone 302 (FIG. 3) that represents the vowel sounds produced by the speaker. Sampler 500 samples the electrical signal at a rate of about ten kHz and provides the samples to ADC 502, which converts each sample into a sixteen-bit digital signal. Formant estimator 400 receives the digital samples from ADC 502 and estimates formants from the speech received via microphone 302. Any suitable digital signal processing technique can be used estimate formants such as, for example, the technique disclosed in the aforementioned dissertation by John F. Houde.

Formant pattern recognizer 401 receives the formant estimates from formant estimator 400 and generates a match score indicative of how well the frequencies of the two lowest frequency maxima (i.e., estimated formants F1 and F2) match F1 and F2 of the target vowel sound. Any suitable definition may be used for generating the match score. In this embodiment, the match score is generated as disclosed in the aforementioned dissertation by John F. Houde. This match score is represented as a percentage, with one hundred percent indicating a substantially perfect match of frequencies.

For each vowel sound produced by the speaker, gain stage 706 receives a match score from formant pattern recognizer 401. The gain of gain stage 706 is a function of the match score, as described below in conjunction with FIG. 9. Gain stage 706 is also connected to receive digital samples from ADC 502, which gain stage 706 amplifies according to the gain of FIG. 9. In this embodiment, the peak gain corresponds to close match of the estimated formants to the formants of the target vowel sound. The gain then gradually declines to unity gain as the actual formant pattern differs from the formant pattern of the target vowel sound.

The amplified digital sample is then received by DAC 602, which generates a corresponding analog signal to be provided to earphones 303 (FIG. 3). Thus, the speaker receives the selectively amplified vowel sound (i.e., amplification of vowel sounds produced by the speaker having formants about the same as the formants of the "target" vowel sound) in real-time, resulting in the feedback modification described above.

Figure 9:
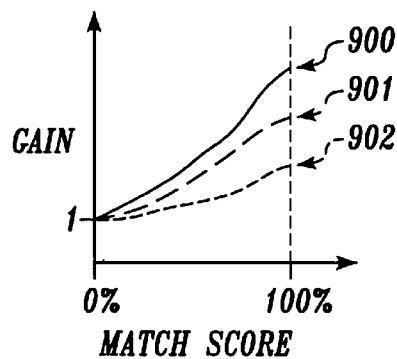
FIG. 9 is a diagram illustrative of a progression of the sensory cue during training for use in the adapter of FIG. 7, in accordance with one embodiment of the present invention.

FIG. 9 is a diagram illustrative of a progression of the sensory cue during training with feedback modifier 301 (FIG. 7), in accordance with one embodiment of the present invention. That is, the gain provided to the sensory cue is changed as the training progresses, according to the needs of the speaker or trainee in hearing or recognizing the target sound and in speaking or producing the target sound. Curve 900 illustrates an initial gain or amplification to be provided to the electrical signal provided by microphone 302 (FIG. 3) as a function of the match score generated by formant pattern recognizer 401 (FIG. 7).

Curve 901 illustrates a gain used later in the training process. In this intermediate stage of the process, the speaker does not need the relatively high level of gain provided by curve 900, so curve 901 has a lower peak gain. At a still later stage of the training process, gain as illustrated by curve 902 is provided. At this later stage, a relatively low amount of gain is sufficient and, thus, curve 902 has a lower peak gain than curve 901. The gain is reduced further as the training process continues until no gain is needed for the speaker to recognize and produce the target vowel sound. Of course, in other embodiments, other gain profiles may be used.

Figure 10:
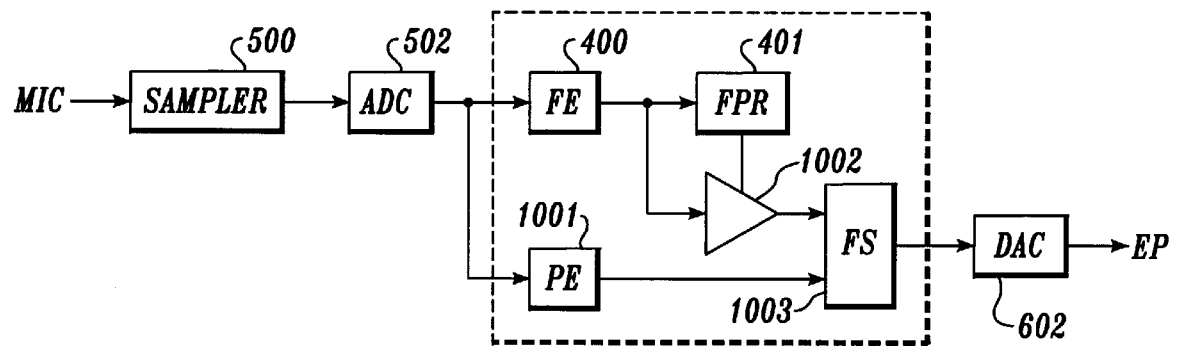
FIG. 10 is a functional block diagram of another embodiment of the present invention.

FIG. 10 is a functional block diagram of another embodiment of the present invention using pitch extractor 1001, formant amplitude modifier 1002 and formant synthesizer 1003. This embodiment is similar to the embodiment of FIG. 7 except that pitch extractor 1001 and formant synthesizer 1003, as disclosed in the aforementioned dissertation by John F. Houde, serve the same purpose of gain stage 706 in FIG. 7. Any suitable implementation of pitch extractor 1001, formant amplitude modifier 1002 and formant synthesizer 1003 may be used, which are well-known in the art.

The embodiments of the feedback modification system for reducing accents described above are illustrative of the principles of this invention and are not intended to limit the invention to the particular embodiments described. For example, in light of the present disclosure, those skilled in the art of speech modification can devise other implementations of the feedback modifier without undue experimentation. Further, those skilled in the art can implement other embodiments of the feedback modification system for detecting sounds other than vowels such as, for example, tones used in some Asian languages (e.g., Mandarin Chinese) and different consonants, liquids and other phonemes. Accordingly, while the preferred embodiment of the invention has been illustrated and described, it will be appreciated that in view of the present disclosure, various changes can be made therein without departing from the spirit and scope of the invention.

I claim:

1. A method for training a speaker to reduce the speaker's accent in speaking a language, the speaker's speech comprising a series of sounds, the method comprising:
   preselecting a sound in the language;
   monitoring the speaker's speech for the preselected sound using an acoustic input device;
   generating a cue in response to detecting the preselected sound using a signal processing device; and
   feeding back the cue to the speaker using an output device, the cue being in a form that is detectable to the speaker, wherein the cue is indicative of the speaker forming the preselected sound correctly.

2. The method of claim 1 wherein the cue is fed back to the speaker with a delay of less than or equal to thirty milliseconds.

3. The method of claim 1 wherein the cue is an amplified in volume version of the detected preselected sound.

4. The method of claim 3 wherein the amplification is configurable.

5. The method of claim 1 wherein the preselected sound in a vowel sound.

6. The method of claim 5 wherein the preselected sound is a vowel sound missing from a language natively spoken by the speaker.

7. The method of claim 6 wherein monitoring the speaker's speech comprises monitoring the speaker's speech for F1 and F2 formants that substantially match F1 and F2 formants of the preselected sound.

8. An apparatus for training a speaker to reduce the speaker's accent in speaking a language, the speaker's speech comprising a series of sounds, the apparatus comprising:
   means for monitoring the speaker's speech for a preselected sound;
   means for generating a cue in response to detecting the preselected sound; and
   means for feeding back the cue to the speaker in a form that is detectable to the speaker the, cue indicating that the speaker has formed the preselected sound correctly.

9. The apparatus of claim 8 wherein the means for feeding back is configured to feed back the cue to the speaker with a delay of less than or equal to thirty milliseconds.

10. The apparatus of claim 8 wherein the cue is an amplification in volume of the detected preselected sound.

11. The apparatus of claim 10 wherein the amplification is configurable.

12. The apparatus of claim 8 wherein the preselected sound in a vowel sound.

13. The apparatus of claim 12 wherein the preselected sound is a vowel sound different from a vowel set of a language natively spoken by the speaker.

14. The apparatus of claim 13 wherein monitoring the speaker's speech comprises monitoring the speaker's speech for F1 and F2 formants that substantially match F1 and F2 formants of the preselected sound.

15. A system for training a speaker to modify the speaker's accent in speaking a language, the speaker's speech comprising a series of sounds, the system comprising:
   an acoustic input device, wherein the acoustic input device is configured to receive the speaker's speech;
   an acoustic output device, wherein the acoustic output device is configured to generate sound that can be sensed by the speaker; and
   an accent modifier coupled to the acoustic input device and the acoustic output device, wherein the accent modifier is configured to:
      receive a signal representing the speaker's speech from the acoustic input device,
      detect whether a sound in the speaker's speech substantially matches a preselected sound,
      generate a cue in response to detecting the match, and
      provide the cue to the acoustic output device.

16. The system of claim 15 wherein the accent modifier is further configured to provide to the acoustic output device the signal representing each unmatching sound at a reference amplification level.

17. The system of claim 16 wherein the cue is an electromagnetic signal representing the detected preselected sound with an amplification greater than the reference amplification level.

18. The system of claim 17 wherein the accent modifier provides the cue and the electromagnetic signals representing the unmatched sounds to the acoustic output device with a delay of less than or equal to thirty milliseconds.

19. The system of claim 15 wherein the preselected sound is a vowel sound missing from a language natively spoken by the speaker.

20. The system of claim 15 wherein the accent modifier is configured to monitor the speaker's speech for F1 and F2 formants that substantially match F1 and F2 formants of the preselected sound.

21. An accent modifier for use in combination with an acoustic input device and an acoustic output device in training a speaker to modify the speaker's accent in speaking a language, the acoustic input device configured to receive the speaker's speech and generate a signal as a function of the speech, the acoustic output device configured to generate sound that can be sensed by the speaker, the speaker's speech comprising a series of sounds, the accent modifier having an input interface configured to be coupled to the acoustic input device and an output interface configured to be coupled to the acoustic output device, wherein the accent modifier is configured to:
   receive a signal representing the speaker's speech at the input interface,
   detect whether a sound in the speaker's speech substantially matches a preselected sound,
   generate a cue in response to detecting the match, and
   provide the cue to the output interface.

22. The accent modifier of claim 21 wherein the accent modifier is further configured to provide to the output device a signal representing each unmatching sound at a reference amplification level.

23. The accent modifier of claim 22 wherein the cue is a signal representing the detected preselected sound with an amplification greater than the reference amplification level.

24. The accent modifier of claim 23 wherein the accent modifier provides the cue and the signals representing the unmatched sounds to the acoustic output device with a delay less than or equal to thirty milliseconds.

25. The accent modifier of claim 21 wherein the preselected sound is a vowel sound missing from a language natively spoken by the speaker.

26. The accent modifier of claim 21 wherein the accent modifier is configured to monitor the speaker's speech for F1 and F2 formants that substantially match F1 and F2 formants of the preselected sound.

27. An accent modifier for use in combination with an acoustic input device and an acoustic output device in training a speaker to modify the speaker's accent in speaking a language, the acoustic input device configured to receive the speaker's speech and generate a signal as a function of the speech, the acoustic output device configured to generate sound that can be sensed by the speaker, the speaker's speech comprising a series of sounds, wherein the accent modifier comprises:

an input interface configured to be coupled to the acoustic input device;

an output interface configured to be coupled to the acoustic output device;

a formant estimator coupled to the input interface, the formant estimator being configured to extract formant information from the speaker's speech;

a formant pattern recognizer coupled to the formant estimator, the sound recognizer being configured to generate a match score indicative of how well formants in sounds of the speaker's speech that match formants of a preselected sound; and a cue generator coupled to the formant pattern recognizer and the output interface, the cue generator being configured to generate a cue as a function of the match score.

28. The accent modifier of claim 27 wherein the cue generator is further configured to provide to the output interface a signal representing each unmatching sound at a reference amplification level.

29. The accent modifier of claim 28 wherein the cue is a signal representing a detected sound having formants substantially matching formants of the preselected sound, with an amplification greater than the reference amplification level.

* * * * *